US012400584B2

(12) United States Patent
Liu

(10) Patent No.: US 12,400,584 B2
(45) Date of Patent: Aug. 26, 2025

(54) METHOD AND APPARATUS FOR DRIVING DISPLAY PANEL, AND DISPLAY DEVICE

(71) Applicant: WUHAN TIANMA MICROELECTRONICS CO., LTD., Wuhan (CN)

(72) Inventor: Xigang Liu, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/772,291

(22) Filed: Jul. 15, 2024

(65) Prior Publication Data

US 2024/0371315 A1 Nov. 7, 2024

(30) Foreign Application Priority Data

Aug. 23, 2023 (CN) ......................... 202311072518.1

(51) Int. Cl.
*G09G 3/32* (2016.01)

(52) U.S. Cl.
CPC ......... *G09G 3/32* (2013.01); *G09G 2310/061* (2013.01); *G09G 2310/08* (2013.01); *G09G 2320/0233* (2013.01)

(58) Field of Classification Search
CPC ........... G09G 3/3208; G09G 2310/061; G09G 3/3233; G09G 3/32; G09G 2320/0233; G09G 2310/08
See application file for complete search history.

(56) References Cited

U.S. PATENT DOCUMENTS

| | | | | |
|---|---|---|---|---|
| 2020/0226978 | A1 | 7/2020 | Lin et al. | |
| 2022/0122535 | A1* | 4/2022 | Jung | H10K 59/1213 |
| 2022/0157263 | A1* | 5/2022 | Moon | G09G 3/3233 |
| 2023/0206826 | A1* | 6/2023 | Park | G09G 3/32<br>345/55 |

FOREIGN PATENT DOCUMENTS

| | | | |
|---|---|---|---|
| CN | 112201208 | A | 1/2021 |

* cited by examiner

*Primary Examiner* — Muhammad N Edun
(74) *Attorney, Agent, or Firm* — KILPATRICK TOWNSEND & STOCKTON LLP

(57) ABSTRACT

A method and an apparatus for driving a display panel, and a display device. A blank-display interval of the display panel is configured between a first display frame and a second display frame of the display panel. The blank-display interval includes a first target interval. During the first target interval, a voltage at a first electrode of each light-emitting element of the display panel is not initialized, and a voltage of a first reference voltage signal configured to initialize the voltage at the first electrode is changed.

19 Claims, 7 Drawing Sheets

METHOD AND APPARATUS FOR DRIVING DISPLAY PANEL, AND DISPLAY DEVICE

The present disclosure claims the priority to Chinese Patent Application No. 202311072518.1, titled "DISPLAY PANEL, METHOD FOR DRIVING DISPLAY PANEL, AND DISPLAY DEVICE", filed on Aug. 23, 2023 with the China National Intellectual Property Administration, the content of which is incorporated herein by reference.

FIELD

The present disclosure relates to the field of display panels, and in particular to a display panel, a method for driving the display panel, and a display device.

BACKGROUND

Various novel display panels such as organic light-emitting diode (OLED) display panels and micro light-emitting diode (micro-LED) display panels are springing with fast development of display techniques. Portable display devices such as a mobile phone are becoming bezel-less. Non-uniform brightness of a display screen is a common problem when using conventional display panels.

SUMMARY

A display panel, a method for driving the display panel, and a display device are provided according to embodiments of the present disclosure. An issue of non-uniform brightness of display panels is effectively addressed, and a display effect of the display panels can be greatly improved.

In one embodiment, a display panel is provided according to embodiments of the present disclosure. A blank-display interval of the display panel is set between a first display frame and a second display frame of the display panel. The blank-display interval includes a first target interval. During the first target interval, a voltage at a first electrode of each light-emitting element of the display panel is not initialized, and a voltage of a first reference voltage signal configured to initialize the voltage at the first electrode is changed.

In one embodiment, a method for driving a display panel is provided according to embodiments of the present disclosure. A blank-display interval of the display panel is set between a first display frame and a second display frame of the display panel. The blank-display interval includes a first target interval. A first reference voltage signal is configured to initialize a voltage at a first electrode of each light-emitting element of the display panel. During the first target interval, the voltage at the first electrode is not initialized. The method includes: changing the voltage of the first reference voltage signal during the first target interval.

In one embodiment, a display device is provided according to an embodiment of the present disclosure. The display device includes the foregoing display panel.

DETAILED DESCRIPTION

Figure 1:
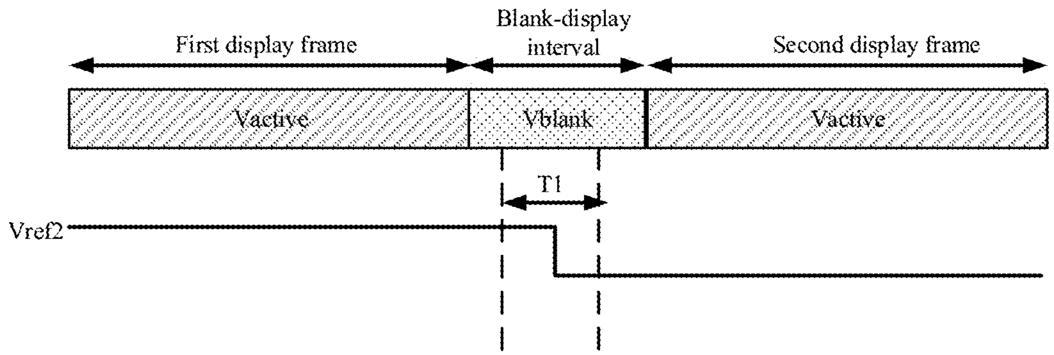
FIG. 1 is a schematic timing diagram of a display panel according to an embodiment of the present disclosure.

Hereinafter features and exemplary embodiments of the present disclosure are described in detail, and the present disclosure is described in detail in conjunction with the drawings and embodiments of the present disclosure. Herein the embodiments are merely intended for explaining the present disclosure, rather than limiting the present disclosure. The present disclosure may be implemented without some details disclosed herein. Following description of embodiments is only illustrative to enhance understanding of the present disclosure.

Herein the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The terms "and/or" used herein merely indicates a relationship between associated objects, which may include three kinds of relationship. For example, "A and/or B" may indicate three candidate cases in which only A exists, both A and B exist, and only B exists, respectively. In addition, herein the symbol "/" indicates a relationship between associated objects before and after the symbol "/" is an "or" relationship.

Herein a transistor may be an N-type transistor or a P-type transistor. An on-state level of the N-type transistor is a high level, while an off-state level of the N-type transistor is a low level. That is, a first electrode and a second electrode of the N-type transistor are electrically connected in a case that the high level is applied on a gate of the N-type transistor, and are electrically disconnected from each other in a case that the low level is applied on the gate of the N-type transistor. An on-state level of the P-type transistor is a low level, while an off-state level of the P-type transistor is a high level. That is, a first electrode and a second electrode of the P-type transistor are electrically connected in a case that the low level is applied on a gate of the P-type transistor, and are electrically disconnected from each other in a case that the high level is applied on the gate of the P-type transistor. Herein the gate of the transistor may serve as a control electrode of the transistor. Depending on a signal and a type of the gate, the first electrode and the second electrode may be the source and the drain, respectively, or may be the drain and the source, respectively, which is not limited herein. In addition, herein the "on-state level" and the "off-state level" are generic terms. The on-state level refers to any level capable of switching on the transistor, and the off-state level refers to any level capable of switching off the transistor.

Herein the term "electrical connection" may refer to direct electrical connection between two components, or electrical connection between two components via one or more intermediate components.

Herein the terms such as a first node, a second node, and a third node are only named to facilitate describing a circuit structure, and may not refer to actual circuit elements.

Various modifications and alternations may be made to embodiments of the present disclosure without departing from a spirit or a scope of the present disclosure. Therefore, the present disclosure is intended to cover the modifications and the alternations that fall within a scope of the claims (e.g., claimed embodiments) and their equivalents. Implementations in embodiments of the present disclosure may be combined with each other as long as there is no conflict.

Hereinafter an issue in the conventional technology is first described to facilitate understanding of embodiments of the present disclosure.

Requirements of the market on performances of display panels are growing higher and higher with fast development of display technology. The invertor's research reveals that brightness of a display screen is non-uniform during usage of conventional display panels, for example, a dark band or a bright band is present at a top or a bottom of the display screen.

A display panel, a method for driving the display panel, and a display device are provided according to embodiments of the present disclosure, to address at least the above issues. A display effect of display panels can be effectively increased, to further enhance competitiveness of commercial display panels.

Embodiments of the present disclosure are not intended for limiting a scope of the present disclosure.

Hereinafter a display panel is first described according to embodiments of the present disclosure. In an embodiment, the display panel may be an organic light-emitting diode (OLED) display panel or of another type, which is not limited herein. It is appreciated that in another embodiment, the display panel may be a micro light-emitting diode (micro-LED) display panel, a quantum-dot display panel, or the like.

Relevant concepts in the present disclosure are explained as follows to facilitate understanding of the embodiments provided herein.

A blank-display interval may be called a V_blank-display interval, a Vporch interval, or a vertical blank-display interval. A display frame refers to periodical duration which is actually utilized for displaying an image (e.g., scanning all pixels), which is also called a Vactive interval. The V_blank-display interval is usually inserted between display frames and is configured to prepare and transmit image data. There is no actual display of any image in such interval. In an embodiment, the V_blank-display interval may be located between writing data of a current frame into the last-scanned pixel row and writing data of a next frame into the first-scanned pixel row.

Reference is made to FIG. 1, which is a schematic timing diagram of a display panel according to an embodiment of the present disclosure. As shown in FIG. 1, a blank-display interval is configured for the display panel (e.g., set by an apparatus for controlling the display panel) between a first display frame and a second display frame, and the blank-display interval includes a first target interval T1. During the first target interval T1, a voltage at a first electrode of each light-emitting element is not initialized, and particularly not initialized by a first reference voltage signal Vref2 configured to initialize the voltage at the first electrode. During the first target interval T1, a voltage of the first reference voltage signal Vref2 is changed.

When written into the first electrode of a light-emitting element, the first reference voltage signal Vref2 is capable to initialize a potential at an anode of the light-emitting element, that is, remove residual charges of a previous display frame. In one embodiment, an image displayed in a next display frame would not be affected, and a service life of the light-emitting element can be improved.

Herein the blank-display interval Vblank between the first display frame and the second display frame, which are adjacent to each other, includes the first target interval T1. During the first target interval T1, the voltage at the first electrode of the light-emitting element is not initialized by the first reference voltage signal Vref2.

As an example, the light-emitting element may be an OLED or the like, and the first electrode of the light-emitting element may be an anode of the light-emitting element, which is not limited herein.

During the first target interval T1, the voltage of the first reference voltage signal Vref2 is changed. In one embodiment, a degree of initialization when resetting the light-emitting elements in the second display frame is adjusted to be different from that when resetting the light-emitting elements in the first display frame, and brightness consistency is maintained between the two adjacent display frames (e.g., the first display frame is a hold display frame while the second display frame is a data-writing display frame).

The first reference voltage signal Vref2 does not function to initialize the voltage at the first electrode of the light-emitting element during the first target interval T1. Therefore, the voltage change of the first reference voltage signal Vref2 would not result in a voltage jump during the initialization at the first electrode of the light-emitting element. Hence, the initialization of the light-emitting element and the brightness of the light emitting element would be influenced by the voltage jump.

Herein a moment of changing the voltage of the first reference voltage signal Vref2 is limited to be within the first target interval, and the voltage would not jump when resetting the light-emitting elements during the blank-display interval Vblank. The brightness consistency of the display panel can therefore be maintained.

The voltage of the first reference voltage signal Vref2 during the blank-display interval Vblank is changed for maintaining brightness consistency between the first display frame and the second display frame that are adjacent to each other. On such basis, types of the first display frame and the second display frame may be reasonably configured to match an effect of the voltage change on the brightness consistency between the two display frames. In one embodiment, the first display frame may be the data-writing display frame, and the second display frame may be the hold display frame. In another embodiment, the first display frame may be the hold display frame, and the second display frame may be the data-writing display frame.

The hold display frame may refer to a display frame in which no display data (e.g., new display data) is written into, for example, pixel circuits of the display panel. Hence, during the hold display frame, the brightness of a screen of the display panel is likely to decrease with time, which results in a brightness difference between the data-writing display frame and the hold display frame when the display panel displays images.

Accordingly, the moment of changing the voltage of the first reference voltage signal Vref2 is configured within to the blank-display interval Vblank from the hold display frame to the data-writing display frame, and/or the blank-display interval Vblank from the data-writing display frame to the hold display frame, and the brightness consistency between adjacent display frames can be ensured with a precise scheme.

Figure 2:
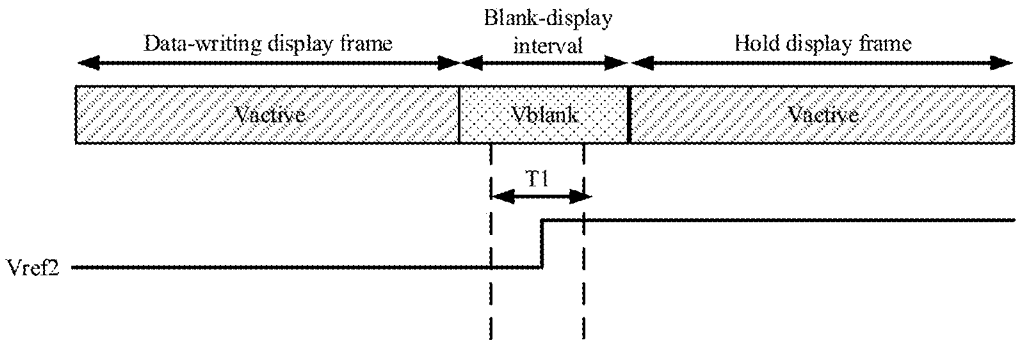
FIG. 2 is another schematic timing diagram of a display panel according to an embodiment of the present disclosure.

Reference is made to FIG. 2, which is another schematic timing diagram of a display panel according to an embodiment of the present disclosure. As shown in FIG. 2, the first display frame and the second display frame are configured as the data-writing display frame and the hold display frame, respectively. In such case, the voltage of the first reference voltage signal Vref2 is switched from a first voltage to a second voltage higher than the first voltage, to ensure the brightness consistency and improve the display effect.

As discussed above, the brightness of the screen of the display panel is likely to decrease with time during the hold display frame. Hence, the voltage of the first reference voltage signal Vref2 is increased in the blank-display interval Vblank from the data-writing display frame to the hold display frame, and the data-writing display frame is different from the hold display frame in a degree of resetting the light-emitting elements of the display panel.

For example, the voltage of the first reference voltage signal Vref2 is switched from −1.6V to −1.3V during the blank-display interval Vblank from the data-writing display frame to the hold display frame. In one embodiment, the display panel may write the first reference voltage signal Vref2 with a higher voltage onto the first electrodes of the light-emitting elements for the hold display frame, and hence the brightness of the display panel can be improved in the hold display frame.

Figure 3:
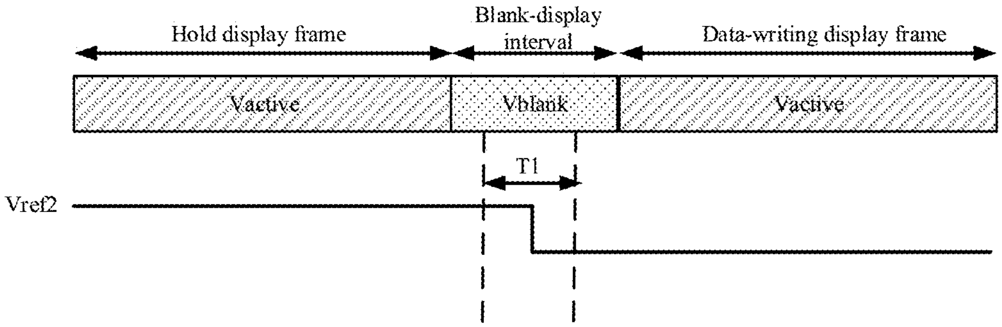
FIG. 3 is another schematic timing diagram of a display panel according to an embodiment of the present disclosure.

Reference is made to FIG. 3, which is another schematic timing diagram of a display panel according to an embodiment of the present disclosure. As shown in FIG. 3, the first display frame and the second display frame are configured as the hold display frame and the data-writing display frame, respectively. In such case, the voltage of the first reference voltage signal Vref2 is switched from a first voltage to a second voltage lower than the first voltage, to ensure the brightness consistency and improve the display effect.

As discussed above, the brightness of the screen of the display panel is likely to decrease with time during the hold display frame. Hence, in the foregoing embodiment, the voltage of the first reference voltage signal Vref2 is increased in the blank-display interval Vblank from the data-writing display frame to the hold display frame, to improve the brightness in the hold display frame.

In a case that a display frame subsequent to the hold display frame is the data-writing display frame, keeping the first reference voltage signal Vref2 at the increased voltage would result in that the data-writing display frames before and after the hold display frame have different voltages of the first reference voltage signals Vref2. In such case, a degree of initialization of the light-emitting elements would be different between these data-writing display frames, and brightness inconsistency is further introduced among different display frames of the display panel.

Therefore, in the case that the first display frame and the second display frame are the hold display frame and the data-writing display frame, respectively, the voltage of the first reference voltage signal Vref2 is decreased during the blank-display interval Vblank from the first display frame to the second display frame, to ensure brightness consistency between different display frames.

For example, the voltage of the first reference voltage signal Vref2 is switched from −1.3V to −1.6V during the blank-display interval Vblank from the hold display frame to the data-writing display frame, and the display panel can write the normal first reference voltage signal Vref2 on the first electrode of the light-emitting element within the data-writing display frame. It is prevented that a high potential written onto the anode of the light-emitting element for the data-writing display frame after the hold display frame results in high brightness of such data-writing display frame. Thus, the degree of initialization of the light-emitting elements keeps constant among different data-writing display frames. The brightness consistency between different display frames and the display effect of the display panel are therefore improved, which enhances competitiveness of commercial display panels.

Figure 4:
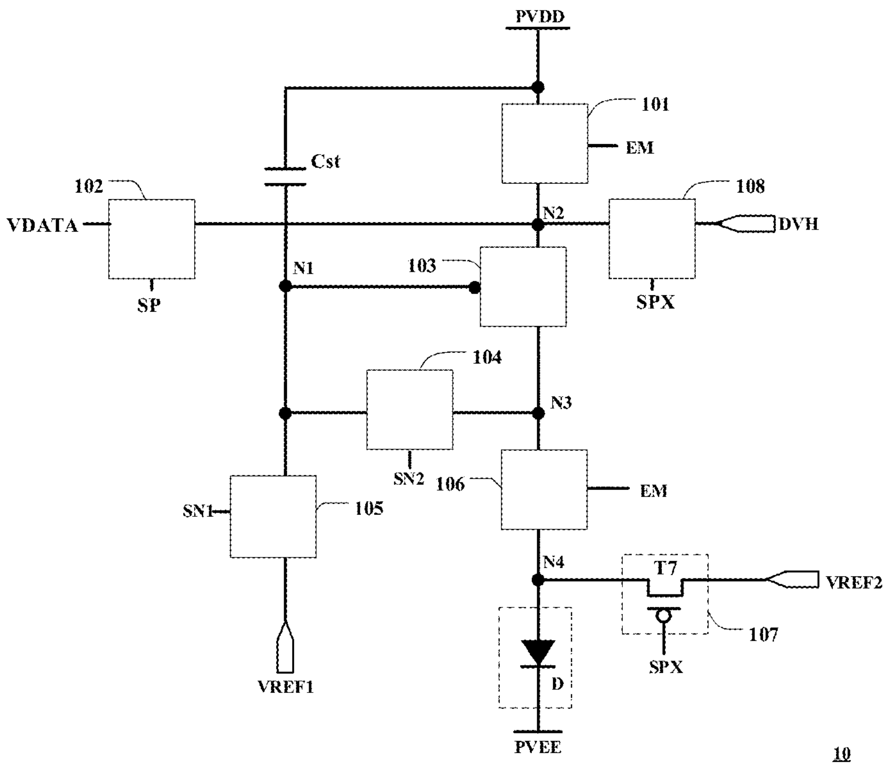
FIG. 4 is a schematic structural diagram of a pixel circuit according to an embodiment of the present disclosure.

Reference is made to FIG. 4, which is a schematic structural diagram of a pixel circuit according to an embodiment of the present disclosure. As shown in FIG. 4, the display panel may include multiple pixel circuits 10, and each pixel circuit 10 may include a first initialization module 107.

In an embodiment, a terminal of the first initialization module 107 is electrically connected to a first reference-signal terminal VREF2. The first reference-signal terminal VREF2 is configured to provide the first reference voltage signal Vref2. Another terminal of the first initialization module 107 is electrically connected to an anode of a light-emitting element D. The first initialization module 107 is configured to transfer the first reference voltage signal Vref2 provided by the first reference-signal terminal VREF2 to the first electrode of the light-emitting element D under control of a first scanning-signal terminal SPX, and the light-emitting element D can be reset through the first electrode.

In an embodiment, the first initialization module 107 may include a seventh transistor T7. A gate of the seventh transistor T7 receives a control signal provided by the first scanning-signal terminal SPX, a first electrode of the seventh transistor T7 is connected to the first reference-signal terminal VREF2, and a second electrode of the seventh transistor T7 is electrically connected to the anode of the light-emitting element D. The control signal provided by the first scanning-signal terminal SPX may be a pulse signal. The seventh transistor T7 is switched on or switch off through a change of the pulse signal between a high level and a low level.

In an embodiment, the first initialization module 107 of the pixel circuit 10 is kept off during the first target interval T1. The first target interval T1 includes a first target moment. The voltage of the first reference voltage signal Vref2 provided by the first reference-signal terminal VREF2 is equal to a first voltage from a start of the first target interval T1 to the first target moment and is equal to a second voltage from the first target moment to an end of the first target interval T1. The first voltage is different from the second voltage.

That is, the voltage of the first reference voltage signal Vref2 is altered at the first target moment within the first target interval T1. In the first target interval T1, the voltage of the first reference voltage signal Vref2 before the first target moment is different from the voltage of the first reference voltage signal Vref2 after the first target moment.

Figure 5:
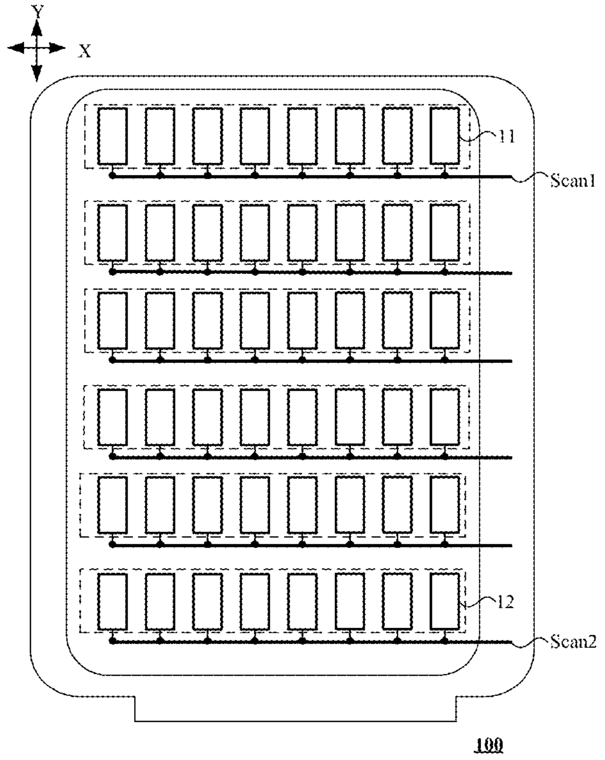
FIG. 5 is a schematic structural diagram of a display panel according to an embodiment of the present disclosure.

Reference is made to FIG. 5, which is a schematic structural diagram of a display panel according to an embodiment of the present disclosure. As shown in FIG. 5, the display panel 100 includes a first pixel circuit 11 and a second pixel circuit 12. The display panel 100 may include multiple pixel rows arranged along a first direction Y in intervals. Each pixel row includes multiple sub-pixels arranged along a second direction X intersecting with the first direction Y. All pixel rows may be sequentially scanned (i.e., progressive scanning) by a scanning signal for writing data. With respect to a single display frame, the first pixel circuit 11 is a pixel circuit in a pixel row that is first scanned, and the second pixel circuit 12 is a pixel circuit in a pixel row that is last scanned.

The first scanning-signal terminal SPX of the first pixel circuit 11 is electrically connected to a first scanning-signal line Scan1. The first scanning-signal terminal SPX of the second pixel circuit 12 is electrically connected to a second scanning-signal line Scan2.

The first pixel circuit 11 and the second pixel circuit 12 each may have a structure identical to that of the pixel circuit 10 as described in the foregoing embodiment(s). The pixel circuits 11 and 12 are named in terms of "first" and "second" only for describing their distinct positions.

Figure 6:
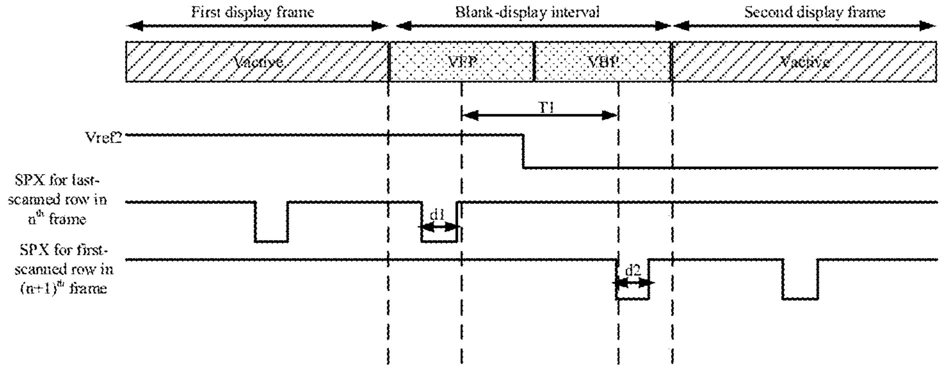
FIG. 6 is another schematic timing diagram of a display panel according to an embodiment of the present disclosure.

Reference is made to FIG. 6 on a basis of FIG. 5. FIG. 6 is another schematic timing diagram of a display panel according to an embodiment of the present disclosure. As shown in FIG. 6, the blank-display interval Vblank includes a vertical front porch (VFP) interval and a vertical back porch (VBP) interval. The VFP interval is precedent to the VBP interval.

The second scanning-signal line Scan2 provides an on-state level during a first period d1 within the VFP interval. In one embodiment, the first scanning-signal line Scan1 provides the on-state level during a second period d2 within the VBP interval. During the first target interval T1, both the first scanning-signal line Scan1 and the second scanning-signal line Scan2 provide off-state levels.

It is assumed that the first display frame is the $n^{th}$ display frame and the second display frame is the $(n+1)^{th}$ display frame. The aforementioned control signal provided by the second scanning-signal line Scan2 serves as the control signal provided by the first scanning-signal terminals SPX of pixel circuits in the last-scanned pixel row in the $n^{th}$ display frame. The aforementioned control signal provided by the first scanning-signal line Scan1 serves as the control signal provided by the first scanning-signal terminals SPX of pixel circuits in the first-scanned pixel row in the $(n+1)^{th}$ display frame.

As shown in FIG. 6, the second scanning-signal line Scan2 provides the on-state level during the first period d1 within the VFP interval, and the first scanning-signal line Scan1 provides the on-state level during the second period d2 within the VBP interval. In an embodiment, the control signal provided by the first scanning-signal terminals SPX of the pixel circuits in the last-scanned pixel row in the $n^{th}$ display frame has an enablement pulse (that is, a low-level pulse as shown in FIG. 6) within the VFP interval, and a period corresponding to the enablement pulse is the first period d1. In one embodiment, the control signal provided by the first scanning-signal terminals SPX of the pixel circuits in the first-scanned pixel row in the $(n+1)^{th}$ display frame has another enablement pulse (that is, a low-level pulse as shown in FIG. 6) within the VBP interval, and a period corresponding to the other enablement pulse is the second period d2.

Here both the first scanning-signal line Scan1 and the second scanning-signal line Scan2 provide an off-state level during the first target interval T1. That is, during the first target interval T1, both the control signal provided by the first scanning-signal terminals SPX of the pixel circuits in the last-scanned pixel row in the $n^{th}$ display frame and the control signal provided by the first scanning-signal terminals SPX of the pixel circuits in the first-scanned pixel row in the $(n+1)^{th}$ display frame are the off-state level (that is, a high level as shown in FIG. 6).

In one embodiment, the first target interval T1 may be at least a part of the blank-display interval Vblank other than the first period d1 and the second period d2.

Reference is further made to FIG. 6. In an embedment, the second scanning-signal line Scan2 provides the on-state level during the first period d1, the first scanning-signal line Scan1 provides the on-state level during the second period d2. In such case, a start moment of the first target interval T1 is later than or simultaneously with an end moment of the first period d1, and an end moment of the first target interval T1 is earlier than or simultaneously with a start moment of the second period d2. Hence, the display effect of the display panel is further improved, and bright bands or dark bands at the top and the bottom of the display panel can be avoided to a more extent.

That is, in a case that the VFP interval includes the first time period d1 and the VBP interval includes the second time period d2, the first target interval T1 may be configured between the end moment of the first time period d1 and the start moment of the second time period d2.

In the foregoing embodiment(s), the voltage of the first reference voltage signal Vref2 is changed within the first target interval T1 in the blank-display interval Vblank, to achieve the brightness consistency between different display frames of the display panel.

In the foregoing scenarios, in a case that the change of the voltage of the first reference voltage signal Vref2 occurs before the first period d1, a degree of initialization of the light-emitting elements, which are in the pixel row at the bottom of the display panel, in the first period d1 would be changed beforehand. Hence, a dark band or a bright band would appear at the bottom of the display panel.

Similarly, in a case that the change of the voltage of the first reference voltage signal Vref2 occurs after the second period d2, a degree of initialization of light-emitting elements, in the pixel row at the top of the display panel, in the second period d2 may be identical to that in the previous (i.e., the first) display frame. Hence, the brightness inconsistency between the first display frame and the second display frame would still exist, and a dark band or a bright band would appear at the top of the display panel.

Therefore, when the voltage of the first reference voltage signal Vref2 is changed after the end moment of the first period d1 while before the start moment of the second period d2, the non-uniform display of the display panel can be effectively corrected, and the bright line or the dark line at the top and the bottom of the display panel can be avoided as much as possible.

Figure 7:
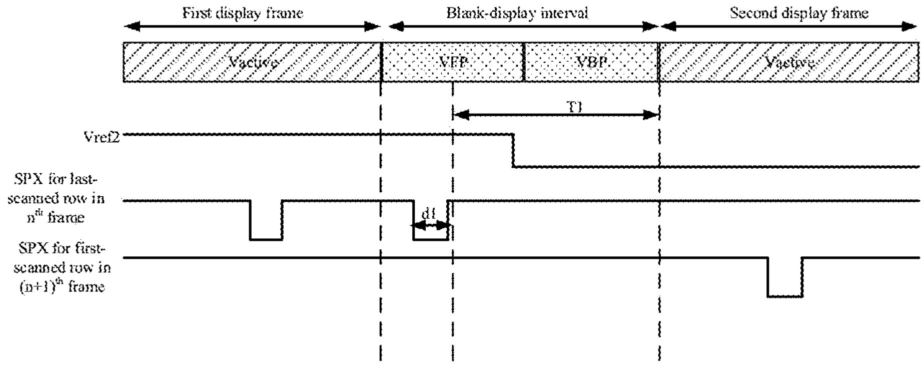
FIG. 7 is another schematic timing diagram of a display panel according to an embodiment of the present disclosure.

Reference is made to FIG. 7, which is another schematic timing diagram of a display panel according to an embodiment of the present disclosure. In some embodiments, timing for resetting the light-emitting elements in the display panel may be configured in various manners. It is taken as an example in FIG. 7 that the second scanning-signal line Scan2 provides the on-state level during the first period d1, and the first scanning-signal line Scan1 always provides the off-state level during the VBP interval.

In such case, the start moment of the first target interval T1 may be later than or simultaneously with the end moment of the first period d1, and the end moment of the first target interval T1 may be earlier than or simultaneously with the end moment of the VBP interval. In one embodiment, the moment of changing the voltage of the first reference voltage signal Vref2 can be appropriately determined in the timing to improve brightness consistency of the display panel. The bright band or the dark band at the bottom of the display panel can be effectively avoided, which improves the display effect of the display panel and enhances the competitiveness of commercial display panels.

Figure 8:
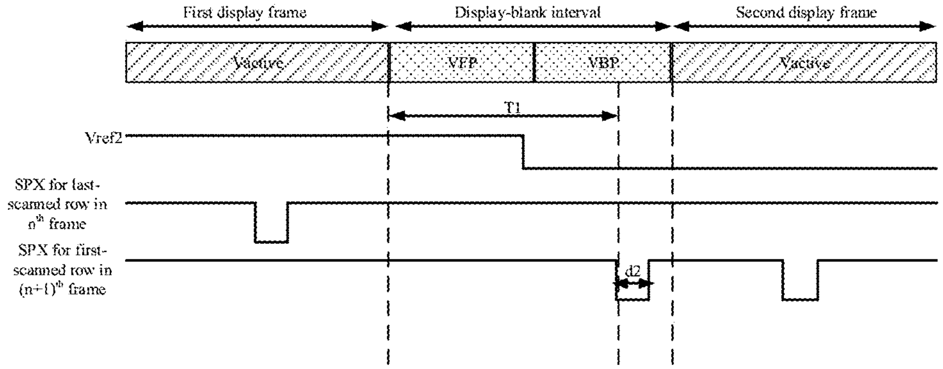
FIG. 8 is another schematic timing diagram of a display panel according to an embodiment of the present disclosure.

Reference is made to FIG. 8, which is another schematic timing diagram of a display panel according to an embodiment of the present disclosure. Similarly, the timing for resetting the light-emitting elements in the display panel may be configured in various manners. It is taken as an example in FIG. 8 that the second scanning-signal line Scan2 always provides the off-state level during the VFP interval, and the first scanning-signal line Scan1 provides the on-state level during the second period d2.

In such case, the start moment of the first target interval T1 may be later than or simultaneously with a start moment of the VFP interval, and the end moment of the first target interval T1 may be earlier than or simultaneously with the end moment of the second period d2. The bright band or the dark band at the top of the display panel can be effectively avoided, which improves the display effect of the display panel and enhances the competitiveness of commercial display panels.

Figure 9:
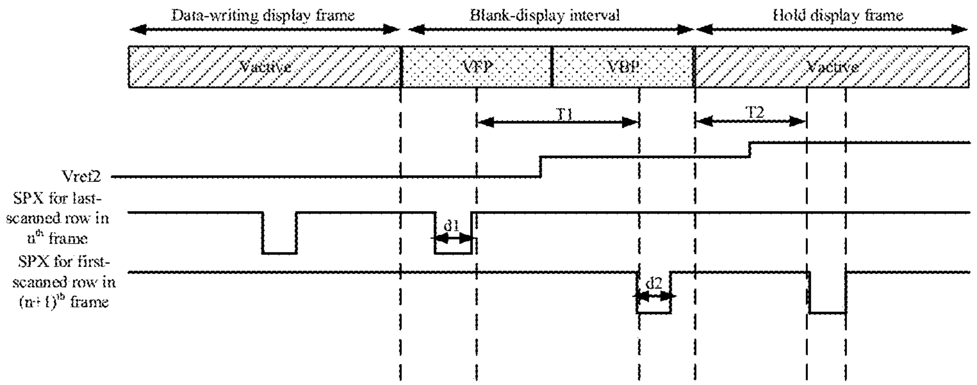
FIG. 9 is another schematic timing diagram of a display panel according to an embodiment of the present disclosure.

Reference is made to FIG. 9, which is another schematic timing diagram of a display panel according to an embodiment of the present disclosure. As shown in FIG. 9, the first display frame and the second display frame are configured as the data-writing display frame and the hold display frame, respectively, and the second display frame further includes a second target interval T2.

A first initialization phase is configured for the first pixel circuit 11 in the second display frame. During the first initialization phase, the first scanning-signal line Scan1 provides the on-state level to reset the light-emitting elements in the first-scanned pixel row through initialization.

A start moment of the second target interval T2 is later than or simultaneously with a start moment of the second display frame, and an end moment of the second target interval T2 is earlier than or simultaneously with a start moment of the first initialization phase. During the second target interval T2, the first scanning-signal line Scan1 does not provide the on-state level.

The second target interval T2 includes a second target moment. The voltage of the first reference voltage signal Vref2 provided by the first reference-signal terminal VREF2 is a third voltage from the start moment of the second target interval T2 to the second target moment, and is a fourth voltage from the second target moment to the end moment of the second target interval T2. The third voltage is different from the fourth voltage. For example, the third voltage is lower than the fourth voltage.

In one embodiment, the voltage change of the first reference voltage signal Vref2 may occur in an interval (i.e. the second target interval T2 as shown in FIG. 9), which is in the second display frame and precedent to the first initialization phase, besides the first target interval T1 in the blank-display interval Vblank. Such configuration further helps improve the brightness consistency between the first display frame and the second display frame.

For example, the voltage of the first reference voltage signal Vref2 may be switched from the first voltage to the second voltage during the first target interval T1, and then switched from the third voltage to the fourth voltage during the second target interval T2. The third voltage may be identical to the second voltage.

In one embodiment, the voltage of the first reference voltage signal Vref2 is changed in a stepped manner, which renders compensation for achieving the brightness consistency between the first display frame and the second display frame more stable. The display effect of the display panel is thus improved.

It is appreciated that the third voltage and the fourth voltage may be flexibly configured according to an actual performance of the panel and an actual requirement on the brightness adjustment. The third voltage and the fourth voltage are not specifically limited herein.

Figure 10:
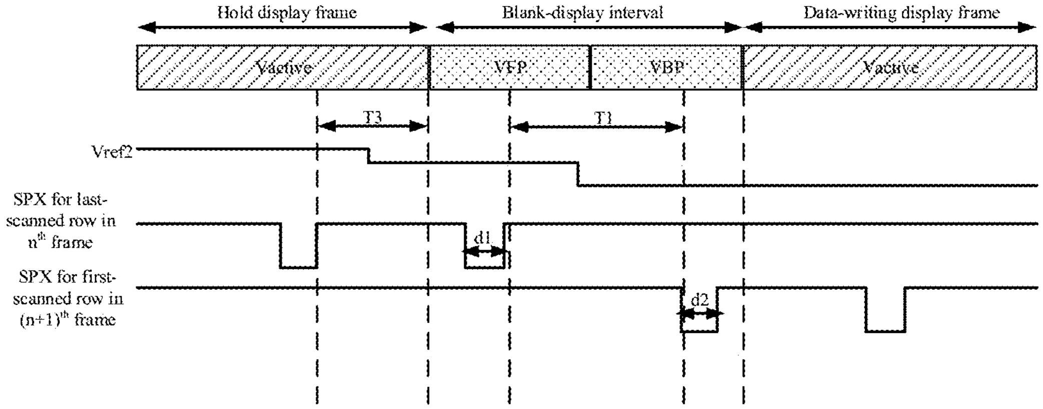
FIG. 10 is another schematic timing diagram of a display panel according to an embodiment of the present disclosure.

Reference is made to FIG. 10, which is another schematic timing diagram of a display panel according to an embodiment of the present disclosure. As shown in FIG. 10, the first display frame and the second display frame are configured to be the hold display frame and the data-writing display frame, respectively, and the first display frame further includes a third target interval T3.

A first initialization phase is configured for the second pixel circuit 12 within the first display frame. During the first initialization phase, the second scanning-signal line Scan2 provides the on-state level.

A start moment of the third target interval T3 is later than or simultaneously with an end moment of the first initialization phase, and an end moment of the third target interval T3 is earlier than or simultaneously with an end moment of the first display frame. During the third target interval T3, the second scanning-signal line Scan2 does not provide the on-state level.

The third target interval T3 includes a third target moment. The voltage of the first reference voltage signal Vref2 provided by the first reference-signal terminal VREF2 is a fifth voltage from the start moment of the third target interval T3 to the third target moment, and is a sixth voltage from the third target moment to the end moment of the third target interval T3. The fifth voltage is different from the sixth voltage.

In one embodiment, the voltage change of the first reference voltage signal Vref2 may occur during an interval (i.e. the third target interval T3 as shown in FIG. 10), which is within the first display frame and precedent to the first initialization phase, besides during the first target interval T1 within the blank-display interval Vblank. Such configuration further helps improve the brightness consistency between the first display frame and the second display frame.

As an example, the voltage of the first reference voltage signal Vref2 may be switched from the fifth voltage to the sixth voltage during the third target interval T3, and then from the first voltage to the second voltage during the first target interval T1. The first voltage may be identical to the sixth voltage. In one embodiment, the voltage of the first reference voltage signal Vref2 is changed in a stepped manner, which renders compensation for achieving the brightness consistency between the first display frame and the second display frame more stable. The display effect of the display panel is thus improved.

It is appreciated that the fifth voltage and the sixth voltage may be flexibly configured according to an actual performance of the panel and an actual requirement on the brightness adjustment. The fifth voltage and the sixth voltage are not specifically limited herein.

Figure 11:
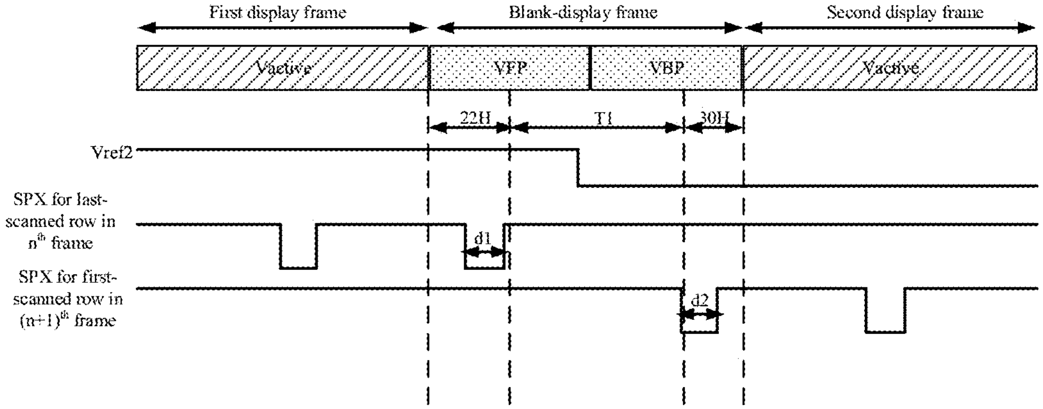
FIG. 11 is another schematic timing diagram of a display panel according to an embodiment of the present disclosure.

Reference is made to FIG. 11, which is another schematic timing diagram of a display panel according to an embodiment of the present disclosure. In some embodiments, experience of actual simulation and adjustment is taken into account. As shown in FIG. 11, the start moment of the first target interval T1 may be later than or simultaneously with a first moment, and the first moment is 22 times of a row-scanning period later than the start moment of the VFP interval. The end moment of the first target interval T1 may be earlier than or simultaneously with a second moment, and the second moment is 30 times of the row-scanning period earlier than the end moment of the VBP interval.

In FIG. 11, H represents the row-scanning period, i.e., time consumed by scanning all pixel circuits in a single 1 row.

Generally, the display panel includes multiple rows of pixel circuits, and a scanning signal for controlling data writing scans all rows of pixel circuits sequentially within duration of a single display frame (also called a cycle of data refresh). Hence, the row-scanning period may be equal to the cycle of data refresh divided by a total number of the rows of pixel circuits in the display panel.

As an example, a frequency of data refresh is 120 Hz, and hence the duration of the single display frame (or the cycle of data refresh) is equal to $\frac{1}{120}$ seconds. In a case that the display panel includes 3000 rows of pixel circuits, H is equal to ($\frac{1}{120}$)/3000 seconds.

Reference is further made to FIG. 11. In an embodiment, N first initialization phases are configured for the first pixel circuit 11 in a first reference interval, and N represents a positive integer. The first reference interval includes an operating interval in the first display frame and the VFP interval. In one embodiment, N first initialization phases are configured for the second pixel circuit 12 in a second reference interval. The second reference interval includes the VBP interval and an operating interval in the second display frame.

The first initialization phases may be configured as follows to render the initialization for resetting the light-emitting elements more appropriate. N may be equal to 2. The $1^{st}$ first initialization phase for first pixel circuit 11 is within the operating interval in the first display frame, and the $2^{nd}$ first initialization phase for the first pixel circuit 11 is within the VFP interval. The $1^{st}$ first initialization phase for the second pixel circuit 12 is within the VBP interval, and the $2^{nd}$ first initialization phase for the second pixel circuit 11 is within the operating interval in the second display frame.

Figure 12:
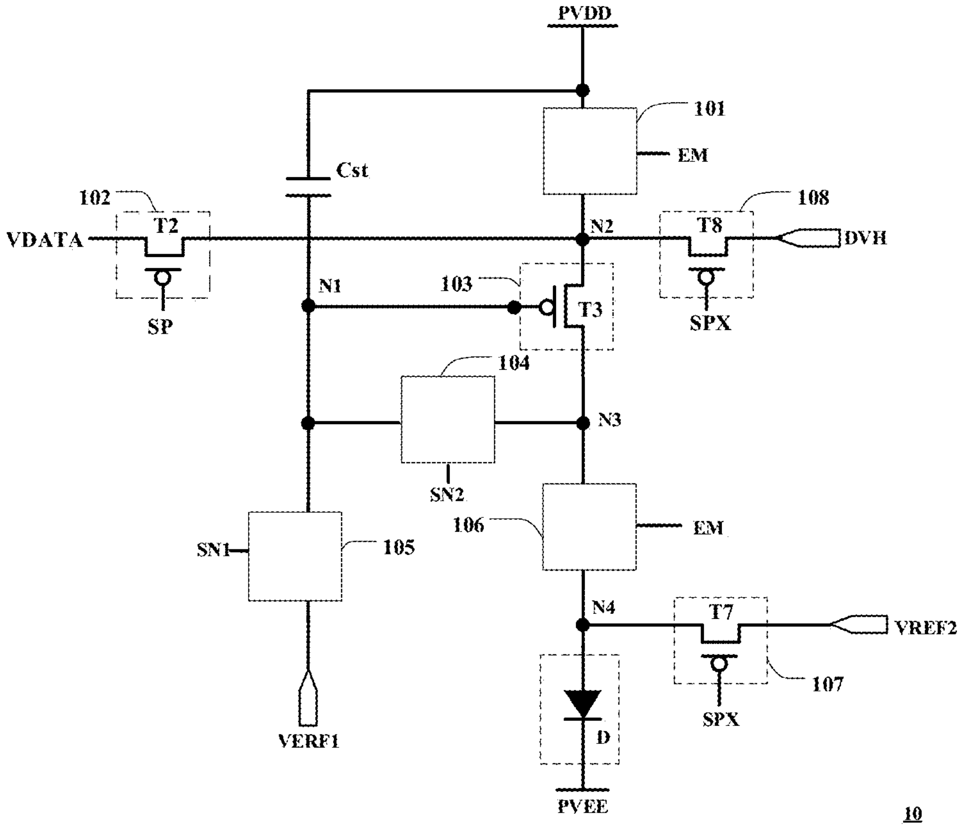
FIG. 12 is another schematic structural diagram of a pixel circuit according to an embodiment of the present disclosure.

Reference is made to FIG. 12, which is another schematic structural diagram of a pixel circuit according to an embodiment of the present disclosure. As shown in FIG. 12, the pixel circuit 10 may further include a driving module 103, a bias-reset module 108, and a data writing module 102.

The driving module 103 is configured to drive the light-emitting element D for light emission.

The bias-reset module 108 is configured to transfer a bias-reset signal provided by a bias-reset signal terminal DVH onto a source and a drain of the driving module 103 under control of a bias-reset scanning terminal SPX, to reset the source and the drain of the driving module 103.

A control terminal of the data writing module 102 is electrically connected to a second scanning-signal terminal SP, a first terminal of the data writing module 102 is electrically connected to a data signal terminal VDATA, and a second terminal of the data writing module 102 is electrically connected to a first terminal of the driving module 103.

Reference is further made to FIG. 12. In an embodiment, the driving module 103 may include a third transistor T3, the data writing module 102 may include a second transistor T2, and the bias-reset module 108 may include an eighth transistor T8.

A gate of the eighth transistor T8 may receive the control signal provided by the first scanning-signal terminal SPX. A first electrode of the eighth transistor T8 is electrically connected to the bias-reset signal terminal DVH, and a second electrode of the eighth transistor T8 is electrically connected to a first electrode of the third transistor T3. A gate of the second transistor T2 may receive a control signal provided by the second scanning-signal terminal SP. A first electrode of the second transistor T2 is electrically connected to the data signal terminal VDATA, and a second electrode of the second transistor T2 is electrically connected to the first electrode of the third transistor T3. The control signal provided by the first scanning-signal terminal SPX and the control signal provided by the second scanning-signal terminal SP each may be a pulse signal. Each of the eighth transistor T8 and the second transistor T2 is switched on or switched off through the pulse signal changing between a high level and a low level.

The third transistor T3 (i.e., a driving transistor) may be an oxide semiconductor transistor. In an embodiment, the third transistor T3 may be an indium gallium zinc oxide (IGZO) transistor, a silicon transistor, a low temperature poly-silicon (LTPS) transistor, or the like.

In an embodiment, the display panel includes the first pixel circuit(s) 11 and the second pixel circuit 12(*s*). The first pixel circuit(s) 11 are in the first-scanned row of pixel circuits (i.e., in the first-scanned pixel row), and the second pixel circuit(s) 12 are in the last-scanned row of pixel circuits (i.e., in the last-scanned pixel row). Signal lines may be appropriately reused to reduce a quantity of the signal lines and save a wiring space.

The bias-reset scanning terminal SPX in the first pixel circuit 11 may be electrically connected to the first scanning-signal line Scan1. The bias-reset scanning terminal SPX in the second pixel circuit 12 may be electrically connected to the second scanning-signal line Scan2.

That is, the first scanning-signal terminal and the bias-reset scanning terminal in a same pixel circuit are electrically connected to the same signal line. In one embodiment, during operation, the bias reset and the initialization on the light-emitting element are controlled by the control signal provided by the same signal line. The signal lines in the display panel are utilized appropriately and efficiently, a cost of manufacture can be reduced, and a display frame of the display screen can be narrower.

Figure 13:
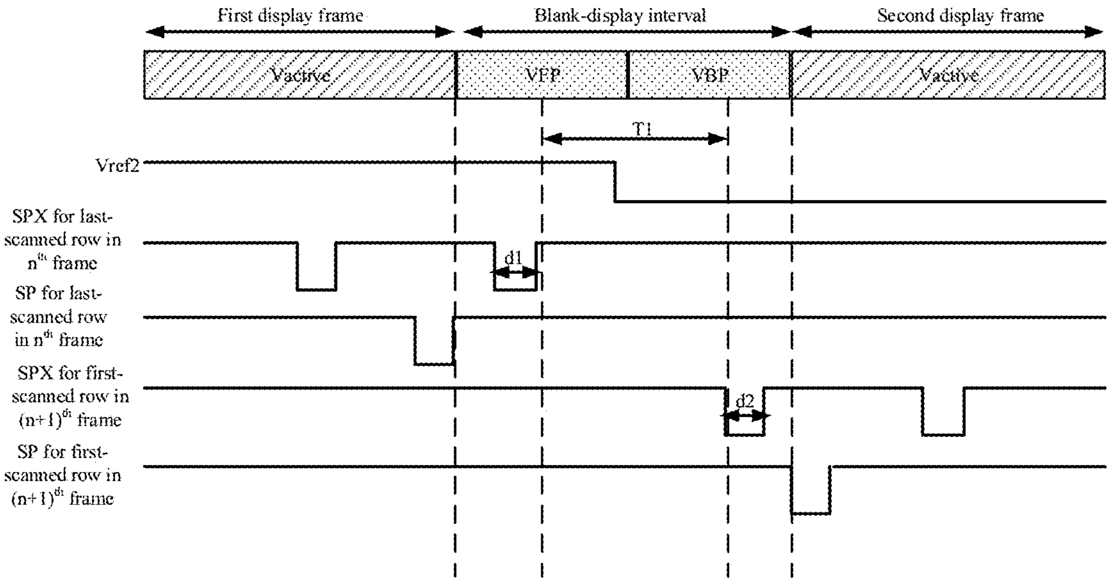
FIG. 13 is another schematic timing diagram of a display panel according to an embodiment of the present disclosure.

Reference is made to FIG. 13, which is another schematic timing diagram of a display panel according to an embodiment of the present disclosure. Similar to the foregoing embodiment(s), the display panel includes the first pixel circuit(s) 11 and the second pixel circuit 12(*s*). The first pixel circuit(s) 11 are in the first-scanned row of pixel circuits, and the second pixel circuit(s) 12 are in the last-scanned row of pixel circuits.

As shown in FIG. 13, an end moment of a data-writing phase of the second pixel circuit 12 is earlier than or simultaneously with the start moment of the VFP interval, and a start moment of a data-writing phase of the first pixel circuit 11 is later than or simultaneously with the end moment of the VBP interval. That is, it is ensured that the data-writing operation on each row of pixel circuits is completed within one display frame, and hence normal display of the display frame is guaranteed.

Reference is further made to FIG. 13. Overall timing of the data writing and the initialization on the light-emitting elements may be appropriately configured. Two first initialization phases are configured for the first pixel circuit within the first reference interval, which includes the operating interval in the first display frame and the VFP interval. Two first initialization phases are configured for the second pixel circuit within the second reference interval, which includes the VBP interval and the operating interval in the second display frame.

The $1^{st}$ first initialization phase for the first pixel circuit 11 may be precedent to the data-writing phase in the first pixel circuit 11, while the $2^{nd}$ first initialization phase for the first pixel circuit 11 is within the VFP interval.

The $1^{st}$ first initialization phase for the second pixel circuit 12 may be within the VBP interval, while the $2^{nd}$ first initialization phase for second pixel circuit 12 is subsequent to the data-writing phase in the $2^{nd}$ first initialization phase.

The data-writing phase may refer to a phase in which a signal provided by the second scanning-signal terminal SP in the pixel circuit is at an enablement level (i.e., a low level as shown in FIG. 13).

As an example, the first display frame as shown in FIG. 13 may be the $n^{th}$ display frame, and the second display frame as shown in FIG. 13 may be the $(n+1)^{th}$ display frame. In the $n^{th}$ display frame, there is a period in which the control signal provided by the second scanning-signal terminals SP of the pixel circuits in the last-scanned pixel row is at the low level, and such period in the $n^{th}$ display frame may serve as the data-writing phase of the second pixel circuit 12. In the $(n+1)^{th}$ display frame, there is a period in which the control signal provided by the second scanning-signal terminals SP of the pixel circuits in the first-scanned pixel row is at the low level, and such period in the $(n+1)^{th}$ display frame may serve as the data-writing phase of the first pixel circuit 11.

Figure 14:
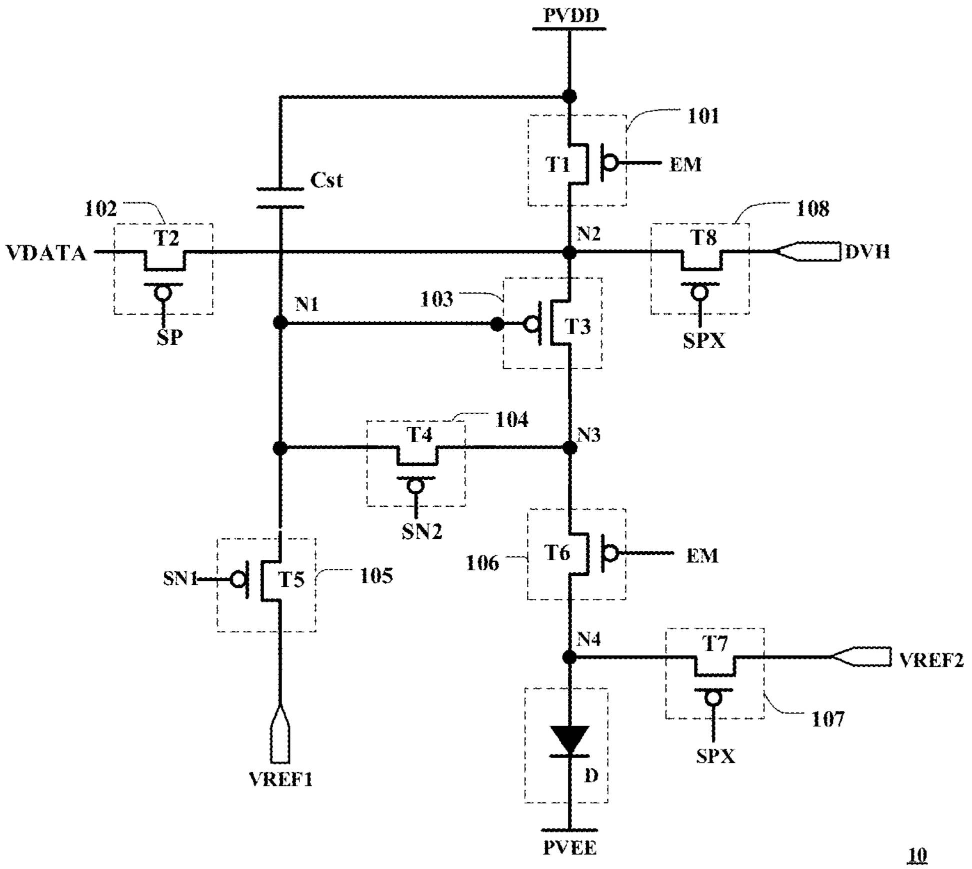
FIG. 14 is another schematic structural diagram of a pixel circuit according to an embodiment of the present disclosure.

Reference is made to FIG. 14, which is another schematic structural diagram of a pixel circuit according to an embodiment of the present disclosure. In an embodiment, the pixel circuit 10 further includes a threshold compensation module 104, a second initialization module 105, a storage module, a first light-emitting control module 101, and a second light-emitting control module 106.

A control terminal of the threshold compensation module 104 is electrically connected to a third scanning-signal terminal SN2, a first terminal of the threshold compensation module is electrically connected to a control terminal of the driving module 103, and a second terminal of the threshold compensation module 104 is electrically connected to a second terminal of the driving module 103.

A control terminal of the second initialization module 105 is electrically connected to a fourth scanning-signal terminal SN1, a first terminal of the second initialization module 105 is electrically connected to a second reference-signal terminal VREF1, and a second terminal of the second initialization module 105 is electrically connected to the control terminal of the driving module 103.

A first terminal of the storage module is electrically connected to a first power-supply signal terminal PVDD, and a second terminal of the storage module is electrically connected to the control terminal of the driving module 103.

A control terminal of the first light-emitting control module 101 is electrically connected to a light-emitting control-signal terminal EM, a first terminal of the first light-emitting control module 101 is electrically connected to the first power-supply signal terminal PVDD, and a second terminal of the first light-emitting control module 101 is electrically connected to the first terminal of the driving module 103.

A control terminal of the second light-emitting control module 106 is electrically connected to the light-emitting control-signal terminal EM, a first terminal of the second light-emitting control module 106 is electrically connected to the second terminal of the driving module 103, and a second terminal of the second light-emitting control module 106 is electrically connected to the first electrode of the light-emitting element D.

A second electrode of the light-emitting element D is electrically connected to a second power-supply signal terminal PVEE. The first power-supply signal terminal PVDD provides a first power-supply voltage, which may be a positive voltage. The second power-supply signal terminal PVEE provides a second power-supply voltage, which may be a negative voltage.

Reference is further made to FIG. 14. Hereinafter the pixel circuit is illustrated in an embodiment. The threshold compensation module 104 may include a fourth transistor T4, the second initialization module 105 may include a fifth transistor T5, the storage module may include a storage capacitor Cst, the first light-emitting control module 101 may include a first transistor T1, and the second light-emitting control module 106 may include a sixth transistor T6.

A control terminal of the fourth transistor T4 is electrically connected to the third scanning-signal terminal SN2, the first terminal of the fourth transistor T4 is electrically connected to the control terminal of the third transistor T3, and the second terminal of the fourth transistor T4 is electrically connected to the second terminal of the third transistor T3. The control terminal of the fifth transistor T5 is electrically connected to the fourth scanning-signal terminal SN1, the first terminal of the fifth transistor T5 is electrically connected to the second reference-signal terminal VREF1, and the second terminal of the fifth transistor T5 is electrically connected to the control terminal of the third transistor T3. The first terminal of the storage capacitor Cst is electrically connected to the first power-supply signal terminal PVDD, and the second terminal of the storage capacitor Cst is electrically connected to the control terminal of the third transistor T3. The control terminal of the first transistor T1 is electrically connected to the light-emitting control-signal terminal EM, the first terminal of the first transistor T1 is electrically connected to the first power-supply signal terminal PVDD, and the second terminal of the first transistor T1 is electrically connected to a first terminal of the third transistor T3. The control terminal of the sixth transistor T6 is electrically connected to the light-emitting control-signal terminal EM, the first terminal of the sixth transistor T6 is electrically connected to the second terminal of the third transistor T3, and the second terminal of the sixth transistor T6 is electrically connected to the first electrode of the light-emitting element D.

The foregoing eight-transistor-one-capacitor (8T1C) structure has been widely applied in display panels. Hence, operation of the pixel circuit in the 8T1C structure as shown in FIG. 14 would not be described in detail for the sake of brevity.

On a basis of the foregoing display panel(s), a method for driving a display panel is further provided according to embodiments of the present disclosure. The driving method is applicable to the foregoing display panel(s).

Figure 15:
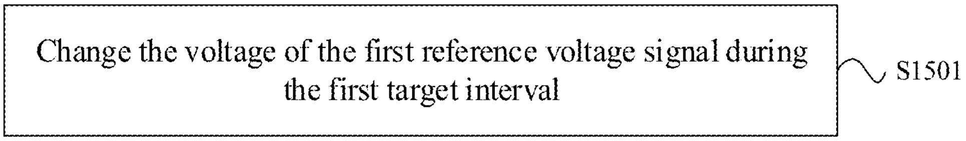
FIG. 15 is schematic flowchart of a method for driving a display panel according to an embodiment of the present disclosure.

FIG. 15 is schematic flow chart of a method for driving a display panel according to an embodiment of the present disclosure. As shown in FIG. 15, the method includes following step S1501.

In step S1501, the voltage of the first reference voltage signal is changed during the first target interval.

Details of implementing the step S1501 may be refer corresponding description in the foregoing embodiment(s), and are not repeated herein.

Herein the voltage of the first reference voltage signal is changed during the first target interval, adjust a degree of initialization when resetting the light-emitting elements in the second display frame to be different from that when resetting the light-emitting elements in the first display frame. In one embodiment, the brightness consistency can be achieved between the two adjacent display frames (e.g., the first display frame is the hold display frame while the second display frame is the data-writing display frame).

During the first target interval, the voltage on the first electrode of each light-emitting element is not initialized by the first reference voltage signal. That is, the voltage jump of the first reference voltage signal does not occur during initialization of the voltage at the first electrode, and hence would not harm an initialization process of the light-emitting elements.

Herein a moment of changing the voltage of the first reference voltage signal is limited to be within the first target interval, and the voltage would not jump when resetting the light-emitting elements during the blank-display interval. The brightness consistency of the display panel can therefore be maintained.

Figure 16:
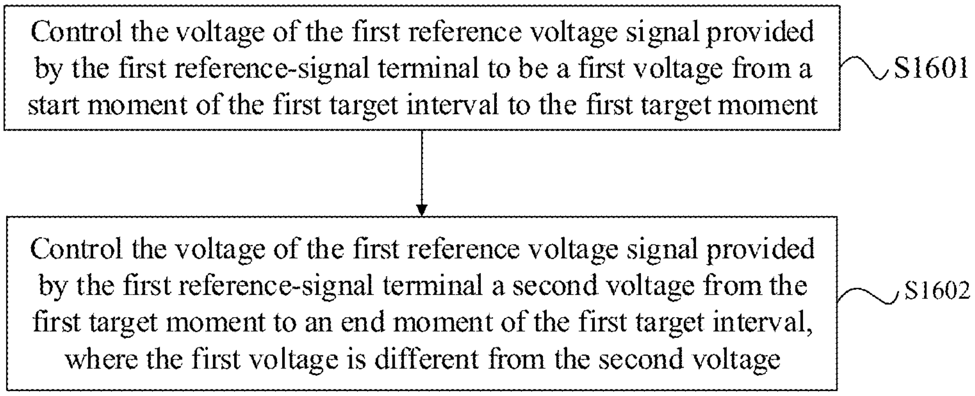
FIG. 16 is schematic flow chart of another method for driving a display panel according to an embodiment of the present disclosure.

Reference is made to FIG. 16, which is a schematic flow chart of another method for driving a display panel according to an embodiment of the present disclosure. In an embodiment, the display panel includes multiple pixel circuits, each of which includes a first initialization module. The first initialization module is configured to transfer the first reference voltage signal provided by a first reference-signal terminal onto the first electrode of the light-emitting element under control of a first scanning-signal terminal, to reset the light-emitting element through the first electrode. During the first target interval, the first initialization module is kept in an off-state. The first target interval includes a first target moment.

The driving method further includes the following steps S1601 to S1602.

In step S1601, the voltage of the first reference voltage signal provided by the first reference-signal terminal is controlled to be a first voltage from a start moment of the first target interval to the first target moment.

In step S1602, the voltage of the first reference voltage signal provided by the first reference-signal terminal is controlled to be a second voltage from the first target moment to an end moment of the first target interval. The first voltage is different from the second voltage.

Details of implementing the steps S1601 and S1602 may be refer corresponding description in the foregoing embodiment(s), and are not repeated herein.

Figure 17:
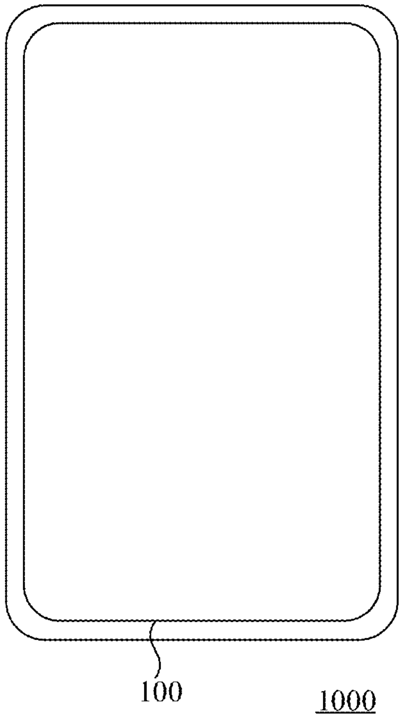
FIG. 17 is a schematic structural diagram of a display device according to an embodiment of the present disclosure.

On a basis of the foregoing display panels(s), a display device is further provided according to an embodiment of present disclosure. The display panel includes the display panel according to the present disclosure. Reference is made to FIG. 17, which is a schematic structural diagram of a display device according to an embodiment of the present disclosure. The display device 1000 as shown in FIG. 17 includes the display panel 100 according to any foregoing embodiment. It is taken as an example in FIG. 11 that the display device 1000 is a mobile phone. Herein the display device may be a wearable product, a computer, a television, a vehicle-mounted display device, or other display devices having a display function. A type of the display device is not specifically limited herein. The display device has the beneficial effects of the display panel 100 in any foregoing embodiment. Details of the beneficial effects may refer to the foregoing description concerning the display panel 100 in the foregoing embodiment(s), and are not repeated herein.

Specific structures of the circuits and the display panels provided in the drawings and the embodiments of the present disclosure are merely exemplary and are not intended for limiting the present disclosure. Embodiments of the present disclosure may be combined with each other as long as there is no conflict.

The embodiments of the present disclosure are described in a progressive manner, and each embodiment places emphasis on the difference from other embodiments. Therefore, one embodiment can refer to other embodiments for the same or similar parts. Not every detail of the embodiments is illustrated in detail, and the present disclosure is not limited to the embodiments. Various modifications and alternations may be made on a basis of the above embodiments. Herein the embodiments are selected and described for explaining principles and practical applications of the present disclosure to facilitate implementation of the present disclosure and making modifications on a basis of the present disclosure. The present disclosure is only limited by a widest scope and equivalents of the claims.

The foregoing embodiments are exemplary rather than restrictive. Different features that appear in different embodiments may be combined to achieve beneficial effects. Other variations of the disclosed embodiments may be implemented through studying the drawings, the specification, and the claims. In the claims, the term "comprise/include" does not exclude other structures which are not listed, and the indefinite article "a/an" does not exclude a case of a plurality. The terms "first" and "second" are intended for distinguishing names rather than indicating any particular order. Any reference numerals in the claims shall not be construed as a limitation of the protection scope of the present disclosure. Features in different dependent claims do not indicate that they cannot be combined to achieve a beneficial effect.

The invention claimed is:

1. An apparatus for driving a display panel, comprising processing circuitry configured to:

set a blank-display interval of the display panel between a first display frame and a second display frame of the display panel;

wherein the blank-display interval comprises a first target interval;

wherein during the first target interval, a voltage at a first electrode of each light-emitting element of the display panel is not initialized, and a voltage of a first reference voltage signal configured to initialize the voltage at the first electrode is changed; and wherein the display panel further comprises a plurality of pixel circuits, wherein:

each pixel circuit of the plurality of pixel circuits comprises a first initialization module;

the first initialization module is configured to transfer the first reference voltage signal provided by a first reference-signal terminal onto the first electrode under control of a first scanning-signal terminal;

the first initialization module is kept in an off-state during the first target interval;

the first target interval comprises a first target moment; and the voltage of the first reference voltage signal is a first voltage from a start moment of the first target interval to the first target moment, and is a second voltage from the first target moment to an end moment of the first target interval, wherein the second voltage is different from the first voltage.

2. The apparatus according to claim 1, wherein:

the first display frame is a data-writing display frame, and the second display frame is a hold display frame; or the first display frame is a hold display frame, and the second display frame is a data-writing display frame.

3. The apparatus according to claim 1, wherein:

the first display frame is a data-writing display frame, and the second display frame is a hold display frame; and the voltage of the first reference voltage signal is switched from a first voltage to a second voltage during the first target interval, and the first voltage is lower than the second voltage.

4. The apparatus according to claim 1, wherein:

the first display frame is the hold display frame, and the second display frame is the data-writing display frame; and the voltage of the first reference voltage signal is switched from a first voltage to a second voltage during the first target interval, and the first voltage is higher than the second voltage.

5. The apparatus according to claim 1, wherein:

the blank-display interval comprises a vertical front porch (VFP) interval and a vertical back porch (VBP) interval, and the vertical front porch interval is precedent to the vertical back porch interval;

the display panel further comprises a first pixel circuit and a second pixel circuit, the first pixel circuit is in a row, which is first scanned in each display frame, among the plurality of pixel circuits, and the second pixel circuit is in a row, which is last scanned in each display frame, among the plurality of pixel circuits;

the first scanning-signal terminal in the first pixel circuit is electrically connected to a first scanning-signal line, and the first scanning-signal terminal in the second pixel circuit is electrically connected to a second scanning-signal line;

the apparatus is further configured to at least one of:

provide, via the second scanning-signal line, an on-state level for switching on the first initialization module during a first period within the VFP interval, and provide, via the first scanning-signal line, the on-state level during a second period within the VBP interval; and the apparatus is further configured to provide, via both the first scanning-signal line and the second scanning-signal line, the off-state level for switching off the first initialization module during the first target interval.

6. The apparatus according to claim 5, wherein:

the apparatus is further configured to provide, via the second scanning-signal line, the on-state level during the first period, and the first scanning-signal line is configured to provide the on-state level during the second period within the VBP interval; and a start moment of the first target interval is later than or simultaneously with an end moment of the first period, and an end moment of the first target interval is earlier than or simultaneously with a start moment of the second period.

7. The apparatus according to claim 5, wherein:

the apparatus is further configured to provide, via the second scanning-signal line, the on-state level during the first period, and the first scanning-signal line is configured to provide the off-state level throughout the VBP interval; and a start moment of the first target interval is later than or simultaneously with an end moment of the first period, and an end moment of the first target interval is earlier than or simultaneously with an end moment of the VBP interval.

8. The apparatus according to claim 5, wherein:

the apparatus is further configured to provide, via the second scanning-signal line, the off-state level throughout the VFP interval, and the first scanning-signal line is configured to provide the on-state level during the second period within the VBP interval; and a start moment of the first target interval is later than or simultaneously with a start moment of the VFP interval, and an end moment of the first target interval is earlier than or simultaneously with an end moment of the second period.

9. The apparatus according to claim 5, wherein:

the first display frame is a data-writing display frame, the second display frame is a hold display frame, and the second display frame further comprises a second target interval;

the apparatus is configured to set a first initialization phase for the first pixel circuit within the second display frame, and provide, via the first scanning-signal line, the on-state level during the first initialization phase;

a start moment of the second target interval is later than or simultaneously with a start moment of the second display frame, an end moment of the second target interval is earlier than or simultaneously with a start moment of the first initialization phase, and the first scanning-signal line is configured to not provide the on-state level during the second target interval;

the second target interval comprises a second target moment; and the voltage of the first reference voltage signal is a third voltage from the start moment of the second target interval to the second target moment and is a fourth voltage from the second target moment to the end moment of the second target interval, and the third voltage is different from the fourth voltage.

10. The apparatus according to claim 5, wherein:

the first display frame is a hold display frame, the second display frame is a data-writing display frame, and the first display frame further comprises a third target interval;

the apparatus is further configured to set a first initialization phase for the second pixel circuit within the first display frame, and provide, via the second scanning-signal line, the on-state level during the first initialization phase;

a start moment of the third target interval is later than or simultaneously with an end moment of the first initialization phase, an end moment of the third target interval is earlier than or simultaneously with an end moment of the first display frame, and the second scanning-signal line is configured to not provide the on-state level during the third target interval;

the third target interval comprises a third target moment; and the voltage of the first reference voltage signal is a fifth voltage from the start moment of the third target interval to the third target moment, and is a sixth voltage from the third target moment to the end moment of the third target interval, and the fifth voltage is different from the sixth voltage.

11. The apparatus according to claim 5, wherein:

a start moment of the first target interval is later than or simultaneously with a first moment, and the first moment is 22 times of a row-scanning period later than the start moment of the VFP interval; and an end moment of the first target interval is earlier than or simultaneously with a second moment, and the second moment is 30 times of the row-scanning period earlier than the end moment of the VBP interval.

12. The apparatus according to claim 5, wherein:

the apparatus is further configured to set N first initialization phases configured for the first pixel circuit during a first reference interval, wherein N is a positive integer, and first reference interval comprises an operating interval in the first display frame and the VFP interval; and the apparatus is further configured to provide, via other N first initialization phases are configured for the second pixel circuit during a second reference interval, wherein second reference interval comprises the VBP interval and an operating interval in the second display frame.

13. The apparatus according to claim 12, wherein:

N is equal to 2;

one of the N first initialization phases is within the operating interval in the first display frame, and another of the N first initialization phases is within the VFP interval; and one of the other first initialization phases is within the VBP interval, and another of the other first initialization phases is within the operating interval in the second display frame.

14. The apparatus according to claim 1, wherein each pixel circuit further comprises:

a driving module, configured to drive the light-emitting element for light emission;

a bias-reset module, configured to transmit a bias-reset signal provided by a bias-reset signal terminal to a first terminal and a second terminal of the driving module under control of a bias-reset scanning terminal to reset voltages on the first terminal and the second terminal of the driving module; and a data writing module, wherein a control terminal of the data writing module is electrically connected to a second scanning-signal terminal, a first terminal of the data writing module is electrically connected to a data signal terminal, and a second terminal of the data writing module is electrically connected to the first terminal of the driving module.

15. The apparatus according to claim 14, wherein:

the display panel comprises a first pixel circuit and a second pixel circuit, the first pixel circuit is in a row, which is first scanned in each display frame, among the plurality of pixel circuits, and the second pixel circuit is in a row, which is last scanned in each display frame, among the plurality of pixel circuits;

the first scanning-signal terminal in the first pixel circuit is electrically connected to a first scanning-signal line, and the first scanning-signal terminal in the second pixel circuit is electrically connected to a second scanning-signal line; and the bias-reset scanning terminal in the first pixel circuit is electrically connected to the first scanning-signal line, and the bias-reset scanning terminal in the second pixel circuit is electrically connected to the second scanning-signal line.

16. The apparatus according to claim 14, wherein:

the display panel comprises a first pixel circuit and a second pixel circuit, the first pixel circuit is in a row, which is first scanned in each display frame, among the plurality of pixel circuits, and the second pixel circuit is in a row, which is last scanned in each display frame, among the plurality of pixel circuits; and an end moment of a data-writing phase of the second pixel circuit is earlier than or simultaneously with a start moment of the VFP interval, and a start moment of a data-writing phase of the first pixel circuit is later than or simultaneously with an end moment of the VBP interval.

17. The apparatus according to claim 16, wherein:

the apparatus is further configured to set two first initialization phases for the first pixel circuit during a first reference interval comprises, and the first reference interval comprises an operating interval in the first display frame and the VFP interval;

the apparatus is further configured to set other two first initialization phases for the second pixel circuit during a second reference interval comprises, and the second reference interval comprises the VBP interval and an operating interval in the second display frame;

one of the two first initialization phases is precedent to the data-writing phase of the first pixel circuit, and another of the two first initialization phases is within the VFP interval; and one of the other two first initialization phases is within the VBP interval, and another of the other two first initialization phases is subsequent to the data writing phase of the second pixel circuit.

18. A method for driving a display panel, wherein the driving method comprises:

changing a voltage of a first reference voltage signal during a first target interval, wherein:

a blank-display interval of the display panel is configured between a first display frame and a second display frame of the display panel;

the blank-display interval comprises the first target interval; and the voltage of the first reference voltage signal is configured to initialize the voltage at the first electrode;

wherein the display panel comprises a plurality of pixel circuits, and each pixel circuit of the plurality of pixel circuits comprises a first initialization module;

wherein the first initialization module is configured to transfer the first reference voltage signal provided by a first reference-signal terminal onto the first electrode under control of a first scanning-signal terminal;

wherein the first initialization module is kept in an off-state during the first target interval;

wherein the first target interval comprises a first target moment; and wherein the method further comprises:

controlling the voltage of the first reference voltage signal to be a first voltage from a start moment of the first target interval to the first target moment; and controlling the voltage of the first reference voltage signal to be a second voltage from the first target moment to an end moment of the first target interval, wherein the first voltage is different from the second voltage.

19. A display device, comprising:

a display panel; and an apparatus for driving the display panel, wherein the apparatus comprising processing circuitry configured to:

set a blank-display interval of the display panel between a first display frame and a second display frame of the display panel;

wherein the blank-display interval comprises a first target interval; and wherein during the first target interval, a voltage at a first electrode of each light-emitting element of the display panel is not initialized, and a voltage of a first reference voltage signal configured to initialize the voltage at the first electrode is changed; and wherein the display panel further comprises a plurality of pixel circuits, wherein:

each pixel circuit of the plurality of pixel circuits comprises a first initialization module;

the first initialization module is configured to transfer the first reference voltage signal provided by a first reference-signal terminal onto the first electrode under control of a first scanning-signal terminal;

the first initialization module is kept in an off-state during the first target interval;

the first target interval comprises a first target moment; and the voltage of the first reference voltage signal is a first voltage from a start moment of the first target interval to the first target moment, and is a second voltage from the first target moment to an end moment of the first target interval, wherein the second voltage is different from the first voltage.

* * * * *